Patented June 22, 1926.

1,589,606

UNITED STATES PATENT OFFICE.

LEON LILIENFELD, OF VIENNA, AUSTRIA.

PROCESS OF MAKING A NEW TYPE OF CELLULOSE DERIVATIVES.

No Drawing. Application filed March 20, 1922, Serial No. 545,365, and in Austria April 2, 1921.

The technical cellulose derivatives and cellulose conversion products previously produced which are insoluble in water and are soluble in aqueous alkalies, are cellulose xanthogenates (viscoses), the cellulose hydrates soluble in alkali, the hydrocelluloses soluble in akali, and the oxycelluloses soluble in alkali.

Viscose is easily worked up to useful technical products such as artificial silk, films and the like; but it is well known to have the following disadvantages: It is of slight stability and is in a continuous, gradually progressing process of decomposition, so that in its use in the arts very especial care must be observed. Furthermore, upon contact with acids it liberates large quantities of hydrogen sulfid and it contains considerable quantities of colored by-products which render the coagulating baths impure —circumstances which are very troublesome and costly as regards the technical exploitation and employment of viscose. The zealous endeavors to make viscose stable in solution or in a solid state have hitherto been unsuccessful.

Cellulose hydrates, hydrocelluloses and oxycelluloses, soluble in alkali, as heretofore made, lead to products which are not technically useful, in consequence of the brittleness of the films, filaments and the like, which may be prepared from their solutions. It is known that, on being heated with a caustic soda solution of 30% strength cellulose is converted into an alkali-soluble conversion product, the so-called acid cellulose. (See Bumcke and Wolffenstein, Berichte der Deutschen Chemischen Gesellschaft, vol. 32 (1899) p. 2501.) Also this body gives brittle products.

I have made the surprising discovery that stable cellulose derivatives which are soluble in aqueous solutions of alkalies are formed if cellulose in any form in which it occurs, or a material containing cellulose, or a suitable cellulose derivative is warmed or heated in the presence of alkylating agents with such quantities of caustic alkalies as are not sufficient in themselves at the same temperatures and in the same times of reaction to convert the cellulose entirely into alkali-soluble conversion products. The cellulose-derivatives thereby produced are stable, are soluble in dilute solutions of alkalies, and are precipitated from these solutions by treatment with acids. The alkaline solutions or pastes of most cellulose derivatives made according to the present process, congeal when spread out in thin layers and treated with acids, acid salts, alcohols or the like, (in short the precipitating baths used in the viscose art), to form coherent products (films, filaments, and the like) which may be washed out with water and then dried to form technically useful products. In water or the customary organic solvents, the cellulose derivatives made according to the present process are not soluble. The new cellulose derivatives made according to the present process are faultlessly stable both in solution and also in the solid state. Most of the new cellulose derivatives produced according to the present process are soluble in strong mineral acids for example hydrochloric acid, and on addition of water, alcohol, glacial acetic acid, acetone or the like, are wholly or partly precipitable from such fresh solutions.

The cellulose derivatives made according to the present process are differentiated from the typical cellulose ethers previously known, in that the former are soluble in alkalis and may be precipitated therefrom with acids, and further in that they are soluble neither in water nor in the customary organic solvents such as benzol, alcohol, alcohol-benzol mixture, acetone, chloroform and the like. The solubility in aqueous alkalies further differentiates them from cellulose ethers stated to be formed from soda cellulose and dimethyl sulfate by Denham and Woodhouse (Journal of the Chemical Society, vols. CIII and CIV, September 1913, pp. 1735 et seq.) In no one of the three stages are the Denham and Woodhouse products of alkylation soluble in alkaline solutions. Some circumstances, particularly the fact that the cellulose derivatives made according to the present process, when heated with very dilute mineral acids, are easily broken up into the corresponding alcohols and alkali-soluble cellulose derivatives or conversion products, seem to indicate that they possibly are or contain bodies of an acetal-like structure, similar to the glycosides of the monosaccharides.

As the starting material for the present process, I may use cellulose in any of the forms in which it occurs, or cellulose-containing materials, or those cellulose derivatives which themselves are soluble in aqueous alkali solutions, (for example crude or purified cellulose xanthogenate), or conversion products of cellulose insoluble in alkalies, as a cellulose hydrate insoluble in alkalies, a hydrocellulose insoluble in alkalies, an oxycellulose insoluble in alkalies, or the aliphatic acid esters of cellulose (with simultaneous saponification in the last mentioned case.)

For carrying out the process, the cellulose or the cellulose containing material or the cellulose derivative is warmed or heated in the presence of alkylating agents with such quantities of caustic alkalies as are not sufficient in themselves at the same temperatures and in the same length of time of reaction, to convert the cellulose into alkali-soluble conversion products.

If the starting material be cellulose or a cellulose containing material or a conversion product of cellulose insoluble in alkalies, then the quantities of caustic alkali necessary for the production of the new cellulose derivatives may be incorporated with the cellulose either by impregnation of the cellulose with alkali solutions of suitable concentration, or the cellulose or the cellulose-containing material or the conversion product of cellulose may be mixed with the necessary quantity of caustic alkali in the form of solid caustic alkali preferably in powdered form in suitable stirring, kneading, rubbing, grinding or mixing apparatus. Mixtures of solid caustic alkali with concentrated or saturated alkali solutions, may likewise be employed.

The alkali-cellulose or the alkali-containing cellulose or the alkali-conversion product of cellulose is then (preferably after a previous comminution and either immediately or after standing for some time,) warmed or heated with an alkylating or aralkylating agent, for example an alkyl or aralkyl ester of an inorganic acid. If a low-boiling alkylating agent be used, for example ethyl chloride or ethyl bromide or the like, then it is advisable to carry out the treatment in an autoclave or another pressure vessel, whereas if higher boiling alkylating agents be used, for example ethyl iodide or dialkyl sulfates or benzyl chloride or the like, then the operation may be performed in an open vessel or in a vessel provided with a reflux condenser.

Relatively low temperatures are sufficient to effect the conversion of the original cellulose or its conversion product into the new, alkali-soluble derivatives.

In general temperatures lying between 40 and 100° are found sufficient. The time of heating may vary considerably. In many cases the reaction is complete even in an hour. In most cases times of reaction of 2 to 12 hours are sufficient. The aforesaid temperatures and times of heating are given as examples, but the invention is not limited to them.

It is also possible to proceed by warming the cellulose or a cellulose-containing material with such quantities of caustic alkalies or caustic alkali solutions as are not in themselves sufficient to convert the cellulose into a conversion product soluble in alkali, and then heating the resulting mass with an alkylating reagent. This process is obviously less advantageous than the one described above.

With regard to the quantities of caustic alkalies and alkylating agents for the making of the new type of cellulose derivatives, it may be regarded as a rule, to which however the invention is not limited, that the quantities of caustic alkali present, calculated as caustic soda, will generally amount to less than one part by weight of caustic soda to one part by weight of air-dried initial cellulose, and that the quantity of the alkylating agent to be used will not amount to more than three molecules of alkylating agent to one molecular equivalent of $C_6H_{10}O_5$ calculated on the whole air-dried starting material. In this calculation the whole air-dried initial material, for example sulfite cellulose, is to be considered as pure cellulose represented by the formula $C_6H_{10}O_5$. On the average, the new type of cellulose derivatives can be manufactured by means of not more than two molecules of alkylating agents per each molecular unit of $C_6H_{10}O_5$, calculated in the aforesaid manner on the whole air-dried starting material if the latter be cellulose or a cellulose-containing material, and by means of not more than one and a half molecules of alkylating agent per molecular unit $C_6H_{10}O_5$ calculated in the aforesaid manner on the whole air-dried starting material if the latter to be a cellulose derivative. As the examples show, the new type of cellulose derivatives can easily be manufactured with considerably less quantities of caustic alkalies and alkylating agents; for instance with quantities of caustic alkali which correspond to a half molecule of caustic alkali to one unit of $C_6H_{10}O_5$ calculated in the aforesaid manner on the whole air-dried starting material (for instance, sulfite cellulose) and for instance, with quantities of alkylating agents which correspond to a third to a half molecule of alkylating agent to one unit $C_6H_{10}O_5$ calculated in the aforesaid manner on the whole air-dried starting material. In the foregoing lines are given by way of example as upper limits quantities of caustic alkalies and alkylating agent that theoretically would produce a highly or even completely alkylated cellulose for instance, the hitherto known typical cellulose ethers either soluble in water or in organic solvents or both. In other words, these quantities should theoretically be sufficient to replace all hydroxylic hydrogen atoms present in the cellulose molecule by alkyl groups. The fact that the quantities above given by way of example as upper limits in the present process do not produce said cellulose ethers is accounted for by the surprising discovery that in alkylating cellulose itself or its near conversion products insoluble in alkalies proportionately large quantities of caustic alkalies and alkylating agents or both do not act to produce such typical cellulose ethers but the here described new types of cellulose derivatives, provided that appropriate amounts of water be present. It may be regarded as a rule that the new types of cellulose derivatives are formed even in the presence of excessively large quantities of alkylating agents and caustic alkalies if the caustic soda solution employed for the impregnation of the cellulose and afterwards present in the reaction mixtures is not considerably stronger than 18 to 20% and at any rate weaker than 25%. In other words, in alkylating an alkali-cellulose in which the water contents is not less than about 3 times the quantity of caustic soda present regardless of the quantities of alkylating agents and caustic alkalies introduced, the resulting product is not the hitherto known cellulose ether but is the new cellulose derivative.

It is self-evident that in technical use, unnecessary excess of reagents is to be avoided. The new cellulose derivatives have no similarity to the typical alkyl ethers of cellulose, either those soluble in water and low in alkyl groups (for example the water-soluble ethyl or methyl celluloses) or those insoluble in water but soluble in organic solvents and rich in alkyl groups, (namely, the more completely etherified alkyl or aralkyl cellulose).

If the incorporation of the caustic alkali does not take place by impregnating the cellulose body, employed as starting material, with a solution of caustic alkali, i. e., by producing alkali-cellulose, but by mixing it with solid caustic alkali or mixture of solid caustic soda and a saturated solution of caustic alkali, it may be regarded as a rule that the quantities of caustic alkali present, calculated as caustic soda, will generally amount to less than one part by weight of caustic alkali, for instance caustic soda to one part by weight of the air-dried initial cellulose body.

To purify the new cellulose derivatives, after completion of the reaction, the reaction mixture is either washed out with water alone or treated with acid and then washed out with water, or washed out with water and then treated with acid and again washed out with water. After having been freed from the by-products of the reaction by washing with water, the reaction product, optionally after a previous treatment with alcohol or alcohol and ether, may be dried, or the washed out reaction product, while in a moist state, may be dissolved in a solution of alkali and the resulting solution used in the arts. The purification may also be accomplished by dissolving the reaction mass in a dilute alkali solution (for example a 5 to 10% solution), then filtering or decanting, then treating it with an acid, collecting the precipitate on a filter, washing with water and, if desired, drying.

For technically working up the new cellulose derivatives, the purification in most cases is not necessary. After the reaction is complete, the reaction mass may be converted as such into a solution or paste by the addition of a solution of alkali; and this solution or paste can then be worked up to technical products by bringing it into the desired form (film, plastic mass, filament, etc.) and treating with suitable precipitating baths such as acids, acids and salts, acid salts, alcohols, etc., and washing and further treating in known manner.

If for the production of the new cellulose derivatives, a cellulose derivative soluble in alkalies be used as the starting material, for example crude or purified viscose, then it is appropriate to work in solution. After heating with the alkylating agent, a more or less viscous solution is obtained. From this solution, by precipitation with acids or also by water alone (with the use of very small quantities of alkylating agents, for example ethylating agents, the new cellulose derivative is precipitated by the simple addition of water) the new substance may be isolated, washed with water if desired and dried.

It is self-evident that even if the process is carried out in this way, the new cellulose derivative need not be first isolated, but the mixture from the reaction which in this case represents a viscous solution, may be applied as such to technical use, if desired after the addition of an alkali solution.

The alkaline solutions of the cellulose derivatives made according to the present process, when spread in thin layers or squirted as threads through nozzles, give when treated with acids, (or salts, acid and salts, acid salts, alcohols, etc., in short when treated with the precipitating baths well known in the viscose art) either transparent, coherent products, or crumbly, friable structures which after proper washing out with water in known manner, have technical usefulness. Accordingly, the cellulose derivatives may be worked up successfully as films, artificial fibers, plastic masses, paints, finishing, filling, sizing, binding agents, adhesives, thickening materials, and fixing media for pigments in textile printing, coatings and layers in any art, etc. The layers, films, filaments, plastic masses, etc., thus made, are insoluble in water.

The following examples are given for the purpose of illustration:

*Example I.*—100 parts by weight of sulfite cellulose (wood pulp) are impregnated with 900 parts by weight of an 8 to 10% solution of caustic soda at room temperature and allowed to stand for 12 to 24 hours. The mass is then pressed to 250 parts by weight, and comminuted either by hand or in a suitable apparatus, for example in a shredder, edge runner or the like. The comminuted mass (optionally after standing for two or three days at about room temperature) has 12.5 to 20 parts by weight of ethyl chloride added, and is heated under pressure, preferably with stirring (for example in an autoclave provided with a stirring apparatus or a rotating autoclave) to 80 to 85° C. and held at this temperature for several hours (for example 6 to 12 hours). A mass which feels moist and which still shows structure results.

By rubbing, kneading or mixing up the mass from the reaction with dilute caustic soda solution (of for example 5 to 10%), a viscous solution is obtained which may be applied to technical use, (if desired after a previous filtration or decantation). If this new cellulose derivative is to be isolated, then the mass as taken from the autoclave may be either stirred up with water, placed on a filter, washed with water until neutral, then taken from the filter and treated with dilute sulfuric or hydrochloric acid, again collected on a filter and washed with water, or the solid mass may be immediately stirred up with dilute sulfuric or hydrochloric acid until it has an acid reaction, placed upon a filter and washed thoroughly with water. In either case the body may be dried or when still in moist condition dissolved in a solution of alkali and worked up into technical products.

The dry body represents a white, flocculent mass, which dissolves in dilute alkali solution; but does not dissolve in volatile organic solvents such as for example alcohol, acetone, benzol, glacial acetic acid and the like.

To purify it and free it from any fibrous particles which have not reacted, the mass from the reaction may be dissolved in dilute alkali solution, and then precipitated from the solution, after a previous filtration or decantation (or other separation from the undissolved cellulose, etc.), whereupon the precipitate is collected on a filter and washed with water, to be dried or dissolved in alkaline solution while still in a moist condition, for technical use.

*Example II.*—The process is conducted the same as in Example I, with the difference, however, that for impregnating the cellulose, a 12 to 13% solution of caustic soda is used, and the impregnated mass is pressed down to 200 parts by weight, after standing for 12 to 24 hours.

The properties of the final product are substantially the same as in Example I.

*Example III.*—The operation is conducted the same as in Examples I and II, merely with the difference that an 18% solution of caustic soda is used for impregnating the cellulose, the impregnated mass being pressed down to 250 to 350 parts by weight, and thereafter heated with 12.5 to 45 parts by weight of ethyl chloride at between 70 and 110° C.

*Example IV.*—The operation is conducted the same as in Examples I, II, III merely with the difference that 100 parts by weight of cellulose are impregnated with 1000 parts by weight of an 18% solution of caustic soda, the impregnated mass being not pressed at all and, after having stood for two or three days, heated with 200 to 285 parts by weight of ethyl chloride between 70 and 110° C.

*Example V.*—100 parts by weight of sulfite cellulose are impregnated with 900–1000 parts by weight of an 18% caustic soda solution at room temperature and allowed to stand for 12 to 24 hours, the mass is then pressed to 250 to 360 parts by weight and either comminuted by hand or in a suitable apparatus, for example in a shredder, edge runner or the like. The comminuted mass (optionally after standing for two to three days at about room temperature) has 40 to 60 parts by weight of di-ethyl sulfate added, and is slowly heated preferably with stirring or kneading in a closed vessel or in a vessel provided with a reflux condenser to 40–60° C. and kept at this temperature 2 to 4 hours. The working up of the resulting product is substantially the same as in the foregoing examples.

*Example VI.*—100 parts by weight of sulfite cellulose are preferably on cooling in a suitable apparatus for example, a shredder or edge runner or a kneading machine, mixed with 50 parts by weight of powdered caustic soda until a homogenous product is obtained. If the mixing is performed in the presence of air the mass will take up 25 to 50 parts by weight of water from the air. The mass is then either directly or after standing for two or three days, brought into a rotating autoclave provided with a stirring apparatus and 80 parts by weight of ethyl chloride are added, thereupon the reaction mixture is heated in the autoclave under pressure and with stirring or agitating to 100 to 110° C. and held at this temperature for 6 to 12 hours. The working up of the resulting product is substantially the same as in the foregoing examples.

*Example VII.*—To 2,000 parts by weight of the solution of a crude or purified xanthogenate (viscose), corresponding to about 160 to 170 parts by weight of starting cellulose, and 160 to 170 parts by weight of caustic soda (for example, a solution of a cellulose xanthogenate described in Patent No. 1,379,351) after being slightly warmed, are added, in small successive portions or at once, 50 to 100 parts by weight of diethyl sulfate, and the mass is continuously stirred or kneaded. The warming is so conducted that the temperature of the mixture undergoing reaction, rises as slowly as possible (for example, 2 to 3 degrees centigrade in 15 minutes), so that after 2 to 2½ hours the temperature has risen to about 40 to 45° C. A viscous solution results. It is cooled off, and optionally after a previous filtering, is either applied directly to technical use, or used for isolation of the new cellulose derivative. The isolation is best accomplished by preferably first diluting with water, and then acidifying the solution by means of dilute sulfuric or hydrochloric acid or another acid; the precipitate formed thereby (or if only 50 parts of diethyl sulfate were used, the precipitation may be effected by adding a large amount of water alone) being collected on a filter, thoroughly washed with water and either dissolved in lye and worked up as technical products, or dried.

The dried body after a suitable comminution consists of a sandy powder, which dissolves in dilute caustic soda solution (for example of 5 to 10%) to a viscous liquid.

The liquid mixture from the reaction as well as the alkaline solution of the isolated body, when spread evenly on a glass plate and precipitated (by being treated with acids or salts or acid salts or another precipitating bath known in the art of viscose), gives a transparent, coherent film.

In the above description I have particularly referred by way of example, to the use of ethylating agents as the alkylating agents to be used. It is to be understood, however, that alkylating agents containing other alkyl groups besides the ethyl group can be similarly employed, in approximately corresponding molecularly equivalent quantities. Thus for example methylating, propylating, amylating, etc. agents can be similarly employed, with the production of useful products. Ethylating agents are very good for use in this process, since they are (as compared with other alkylating agents) relatively cheap and highly efficient, and the products produced are of excellent quality and character.

In working up the new cellulose derivatives, into technical products, various softening agents, or agents for increasing the plasticity, suppleness, softness and flexibility of plastics, films, and threads, etc., may be added such for example as 7% to 50% of oils, fats, glycerine, sugars, soaps, Turkey red oil and substitutes for Turkey red oil, etc., (based on the weight of the original cellulose), these being conveniently added before the final precipitation.

The expression " cellulosic body " in the specification as well as in the claims means: cellulose itself, its conversion products insoluble in alkali and its derivatives in which the cellulose molecule is not depolymerized or is only slightly depolymerized.

The expressions " alkyl," " alkylation," " alkylating " are intended to cover also " aralkyl," " aralkylation," " aralkylating," respectively the latter referring to metathetical reactions of actual alkyl groups.

The expressions " ethers," " etherification," "etherifying agents" refer to alkylation and aralkylation.

The expression: " products useful in the technics of cellulose " means films, artificial filaments, plastic masses, finishing, filling, and sizing goods, binding agents, adhesives, thickening agents, coatings, layers of any kind, etc.

Where in the appended claims I have referred to proportions of caustic alkali by " parts by weight " and have referred to percentage strength of caustic alkali solution, the figures refer particularly to caustic soda, but the invention of course embraces the use of chemically equivalent proportions and concentrations of other caustic alkalies.

I claim:

1. A process of making new cellulose derivatives which are soluble in alkali solutions but not in water, which comprises heating a cellulosic body in the presence of an alkylating agent, water and a caustic alkali, the proportions being as follows:—for one molecule of cellulosic material, the air dry cellulosic material being figured as $C_6H_{10}O_5$, there are present from about one half molecule up to about four molecules of caustic alkali, and from about one third molecule up to about three molecules of alkylating agent, the water and caustic alkali being present in such proportions as to represent a caustic alkali solution of about 12 to 25% strength.

2. A process of making new cellulose derivatives which are soluble in alkali solutions but not in water, which comprises heating a cellulosic body in the presence of an alkylating agent, water and a caustic alkali, the proportions being as follows: for one molecule of cellulosic material the air dry cellulosic material being figured as $C_6H_{10}O_5$, there are present from about one half molecule up to about four molecules of caustic alkali, and from about one third molecule up to about three molecules of alkylating agent, the water and caustic alkali being present in such proportions as to represent a caustic alkali solution of about 12 to 25% strength.

3. A process of making new cellulose derivatives which are soluble in alkali solutions but not in water, which comprises heating a cellulosic body in the presence of an alkylating agent, water and a caustic alkali, the proportions being as follows:—for one molecule of cellulosic material the air dry cellulosic material being figured at $C_6H_{10}O_5$, there are present from about one half to about two molecules of caustic alkali, and from about one third to about one and a half molecules of alkylating agent, and the said water and caustic alkali being present in such amounts as to represent an 18 to 20% solution of caustic alkali.

4. A process of making new cellulose derivatives which are soluble in alkali solutions but not in water, which comprises heating a cellulosic body in the presence of an alkylating agent, water and a caustic alkali, the proportions being as follows:— for one molecule of cellulosic material, the air dry cellulosic material being figured as $C_6H_{10}O_5$, there are present from about one half molecule up to about four molecules of caustic alkali, and from about one third molecule up to about three molecules of alkylating agent, the water and caustic alkali being present in such proportions as to represent a caustic alkali solution of about 12 to 25% strength, and thereafter dissolving the said derivative in a solution of an alkali.

5. A process of making new cellulose derivatives that contain alkyl groups and are soluble in alkali solutions, but not in water, which process comprises heating a cellulosic body in the presence of a solution of caustic alkali of between about 12% and about 25% strength with an amount of alkylating agent in the relative proportions of not more than three molecules of alkylating agent to each molecular unit $C_6H_{10}O_5$, in such computation the entire air-dry content of the cellulosic starting material being considered as pure cellulose represented by the formula $C_6H_{10}O_5$.

6. A process of making new cellulose derivatives that contain alkyl groups and are soluble in alkali solutions but not in water, which process comprises heating a cellulosic body in the presence of a solution of caustic alkali of between about 12% and about 25% strength with an amount of alkylating agent in the relative proportions of not more than three molecules of alkylating agent to each molecular unit of $C_6H_{10}O_5$, in such computation the entire air-dry content of the cellulosic starting material being considered as pure cellulose represented by the formula $C_6H_{10}O_5$ and thereafter isolating the new derivatives from the reaction mixtures.

7. A process of making new cellulose derivatives that contain alkyl groups and are soluble in alkali solutions but not in water, which process comprises heating a cellulosic body in the presence of a solution of caustic alkali of between about 12% and about 25% strength with an amount of alkylating agent in the relative proportions of not more than three molecules of alkylating agent to each molecular unit of $C_6H_{10}O_5$, in such computation the entire air-dry content of the cellulosic starting material being considered as pure cellulose represented by the formula $C_6H_{10}O_5$ and thereafter isolating the new derivatives from the reaction mixtures of such procedure involving washing with an aqueous liquid.

8. A process of making new cellulose derivatives that contain alkyl groups and are soluble in alkali solutions but not in water, which process comprises heating a cellulosic body in the presence of a solution of caustic alkali of between about 12% and about 25% strength with an amount of alkylating agent in the relative proportions of not more than three molecules of alkylating agent to each molecular unit of $C_6H_{10}O_5$, in such computation the entire air-dry content of the cellulosic starting material being considered as pure cellulose represented by the formula $C_6H_{10}O_5$ and thereafter dissolving the new cellulose derivative in a solution of alkali.

9. A process of making new cellulose derivatives that contain alkyl groups and are soluble in alkali solutions but not in water, which process comprises heating a cellulosic body with an amount of alkylating agent in the relative proportions of less than two molecules of alkylating agent to each molecular unit of $C_6H_{10}O_5$, in such computation the entire air-dry content of the cellulosic starting material being considered as pure cellulose represented by the formula $C_6H_{10}O_5$ and in the presence of a caustic alkali solution of between about 12% and about 25% strength in such an amount that there is present less than one part by weight of caustic alkali to one part by weight of the air-dry cellulosic starting material.

10. A process of making new cellulose derivatives that contain alkyl groups and are soluble in alkali solutions, but not in water, which process comprises heating a cellulosic body with alkylating agents in the presence of caustic alkali and in an amount of water not less than 3 times the quantity of caustic alkali present.

11. A process of making new cellulose derivatives that contain alkyl groups and are soluble in alkali solutions, but not in water, which process comprises treating cellulosic bodies with solid caustic alkali in a quantity which is less than nine tenths of the weight of the air-dried starting material and heating the thus obtained product with an alkylating agent.

12. A process of making new cellulose derivatives that contain alkyl groups and are soluble in alkali solutions, but not in water, which process comprises treating cellulosic bodies with a mixture of solid caustic alkali and a saturated solution of caustic alkali which together contain less caustic alkali than nine tenths of the weight of the air-dried starting material and heating the thus obtained product with an alkylating agent.

13. A process which comprises heating an alkali cellulose prepared by means of a solution of caustic alkali of between about 12% and about 25% strength with alkylating agents.

14. A process which comprises impregnating a cellulosic body with a caustic alkali solution of between about 12% and about 25% strength and heating the thus obtained alkali cellulose in the presence of an alkylating agent.

15. A process which comprises impregnating a cellulosic body with a caustic alkali solution of between about 12% and about 25% strength, removing the excess of the caustic alkali solution and heating the thus obtained alkali cellulose in the presence of an alkylating agent.

16. A process which comprises adding to an alkaline solution of a cellulose xanthogenate prepared from 160 to 170 parts of cellulose one third to one molecule of an alkylating agent for each molecule of cellulose and slowly heating the mixture.

17. As new products, cellulose derivatives that contain alkyl groups and are soluble in alkali solutions but not in water.

18. As new products, alkylated cellulosic materials that are soluble in alkali solutions, insoluble in water, and in benzol and alcohol, and in mixtures thereof and in chloroform.

19. As new products, alkylated cellulosic materials, soluble in alkali solutions, the solutions in alkali being capable of precipitation by treatment with such agents as are capable of precipitating viscose.

20. As new products, cellulose derivatives that contain alkyl groups, in which the degree of alkylation is less than the amount necessary to produce products which are soluble in water or volatile organic solvents.

21. A regenerated alkylated cellulose structure soluble in alkali solutions but insoluble in water.

22. A partly alkylated cellulose derivative, such product being soluble in dilute caustic alkali solution, and in concentrated hydrochloric acid.

23. A partly alkylated cellulose derivative, such product being soluble in dilute caustic alkali solution, and in concentrated mineral acid, and insoluble in hot and cold water.

24. A partly alkylated cellulose derivative, such product being soluble in dilute caustic alkali solution, and in concentrated hydrochloric acid, insoluble in water and in dilute acids.

25. A partly alkylated cellulose derivative, such product being easily soluble in dilute caustic alkali solution, soluble in concentrated hydrochloric acid, the solutions in caustic alkali being readily precipitatable, as coherent masses, by the common precipitants of viscose, and being insoluble in water and in the common organic solvents.

26. A process which comprises mixing 200 parts cellulose with from about one eighth to about nine tenths of its own weight of caustic alkali and water sufficient to dissolve said caustic alkali, and with an alkylating agent corresponding in amount to from 25 to 90 parts of ethyl chloride and warming the mass.

In testimony whereof I affix my signature.

LEON LILIENFELD.